(12) United States Patent
Katsura

(10) Patent No.: US 6,842,211 B2
(45) Date of Patent: Jan. 11, 2005

(54) LIQUID CRYSTAL DISPLAY DEVICE, AND METHOD OF MANUFACTURING THE SAME

(75) Inventor: Hideki Katsura, Atsugi (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 152 days.

(21) Appl. No.: 09/985,043

(22) Filed: Nov. 1, 2001

(65) Prior Publication Data

US 2002/0051112 A1 May 2, 2002

(30) Foreign Application Priority Data

Nov. 2, 2000 (JP) ........................................ 2000-335569

(51) Int. Cl.[7] ...................... G02F 1/1337; G02F 1/1339
(52) U.S. Cl. .......................... 349/123; 349/155; 349/156
(58) Field of Search ................................. 349/123, 155, 349/156, 126, 153, 125

(56) References Cited

U.S. PATENT DOCUMENTS

| | | | | |
|---|---|---|---|---|
| 4,341,445 A | * | 7/1982 | Matsuyama et al. | ........ 350/344 |
| 4,381,886 A | * | 5/1983 | Yokokura et al. | ........... 350/341 |
| 4,691,995 A | | 9/1987 | Yamazaki et al. | |
| 4,752,204 A | * | 6/1988 | Kataoka | ..................... 425/384 |
| 4,844,597 A | * | 7/1989 | Katagiri et al. | ............. 350/350 |
| 6,236,444 B1 | | 5/2001 | Konuma et al. | |
| 6,304,308 B1 | * | 10/2001 | Saito et al. | .................. 349/155 |
| 6,327,016 B1 | * | 12/2001 | Yamada et al. | ............. 349/160 |
| 6,466,296 B1 | * | 10/2002 | Yamada et al. | ............. 349/160 |
| 6,476,894 B1 | * | 11/2002 | Kikkawa | ..................... 349/123 |
| 6,556,260 B1 | * | 4/2003 | Itou et al. | ...................... 349/69 |
| 2002/0027630 A1 | * | 3/2002 | Yamada et al. | ............. 349/123 |
| 2003/0133064 A1 | * | 7/2003 | Kondo et al. | ................ 349/123 |

FOREIGN PATENT DOCUMENTS

| | | | |
|---|---|---|---|
| JP | 10-123528 | | 5/1998 |
| JP | 2000-56314 | * | 2/2000 |

OTHER PUBLICATIONS

Iguchi et al., Flow–Controlled Alignment of Smectric Liquid Crystal by "Grooves" and "Ribs", ILCC 2000, p. 476.
Iguchi et al., "Flow–Controlled Alignment of Smectic Liquid Crystal by Grooves and Ribs", (distributed paper by M. Iguchi at ILCC 2000).
Park et al., "Vertically–aligned Liquid Crystal Display With Wide–Viewing Axial Symmetry Using Surface Relief Gratings on Polymer", ILCC 2000, p. 125.

* cited by examiner

Primary Examiner—Robert H. Kim
Assistant Examiner—Mike Qi
(74) Attorney, Agent, or Firm—Eric J. Robinson; Robinson Intellectual Property Law Office, P.C.

(57) ABSTRACT

A technique for providing a liquid crystal display device which has an excellent production yield but little orientation fault.

A liquid crystal display device in which an orientation regulating member 108 including a trunk portion 108a and a branch portion 108b is formed between a seal member 112 and a liquid crystal 114 so that not only a mechanical strength is enhanced but also the liquid crystal molecules can be homogeneously arrayed to establish a satisfactory black level when no voltage is applied, thereby to improve the contrast.

30 Claims, 13 Drawing Sheets

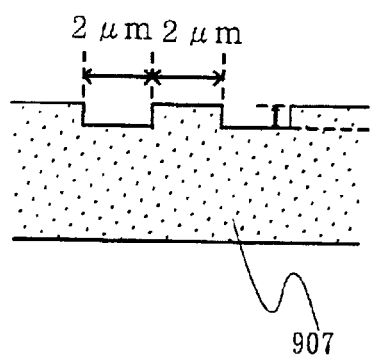
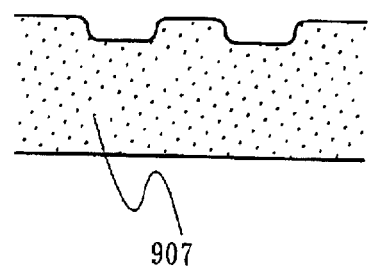
Fig. 3A
Fig. 3B

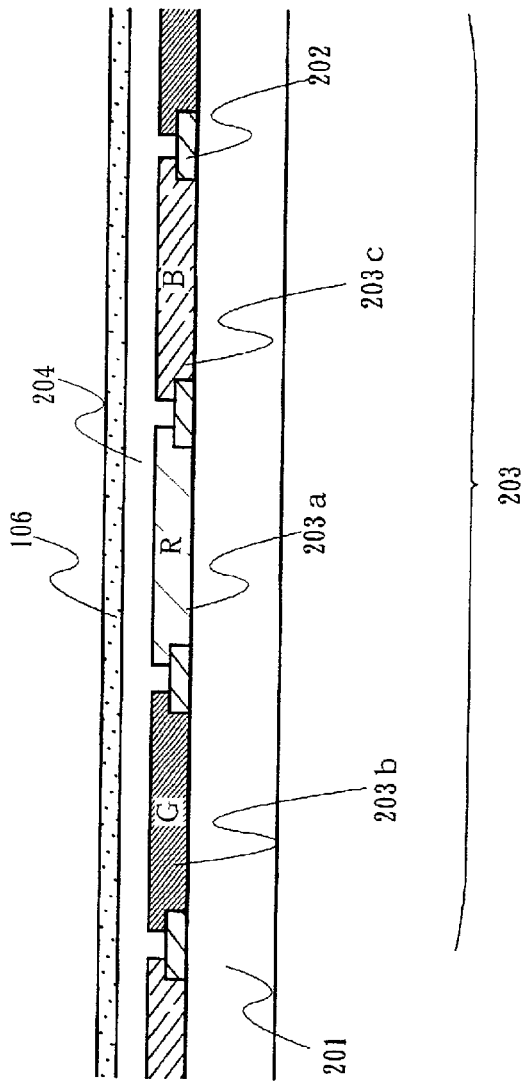
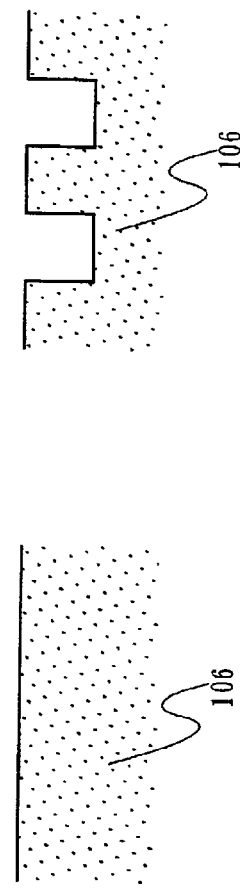
Fig. 4A
enlarged diagrams of opposed electrode 106
Fig. 4B
Fig. 4C

LIQUID CRYSTAL DISPLAY DEVICE, AND METHOD OF MANUFACTURING THE SAME

BACKGROUND OF THE INVENTION

1. Field of the Invention

The present invention relates to a technique for improving the productivity of a semiconductor device and, more particularly, to a display device having a circuit composed of a thin film transistor (TFT), and a method of manufacturing the display device. The present invention further relates to a liquid crystal display device and an electronic device having the liquid crystal display device mounted thereon.

2. Prior Art

In recent years, there has been noted the technique for constructing the TFT using a semiconductor film (having a thickness of about several to several hundreds nm) formed over a substrate having an insulating surface. The TFT is widely applied to an electronic device such as an integrated circuit (IC) or an electrooptical device and has been urgently developed as a switching element for a liquid crystal display device.

The liquid crystal display device is widely used as a display device having advantages in light weight and small thickness and in low power consumption, such as a mobile terminal, e.g., a note personal computer in the business aspect or the monitor of a personal computer or a thin TV in home. The liquid crystal display device is taking reliable place of the CRT which has been a major role in the display device.

Generally, the display device is the means for making the information visually recognizable such as the image transformed and transmitted in electric signals, so that the electric signals can be adversely transformed into the optical signals and reconstructed into the image. There have been made a number of such display devices including the liquid crystal display device.

The liquid crystal display device is a mechanism which is enabled as an electric shutter or valve to control the transmission or non-transmittance of a light emitted from a light source, by using the electric or optical anisotropy owned by the liquid crystal, so that the electric image signals applied to the display device may be made visible.

In order that the optical anisotropy owned by the liquid crystal may be effectively used to make visible the electric signals applied to the liquid crystal, the liquid crystal molecules are oriented in a predetermined state in the liquid crystal display panel (or the liquid crystal panel). The method of applying the electric signals and the orientation of the liquid crystal molecules are closely correlated to each other, and several methods have been proposed heretofore. Generally, these operating methods are called the "operation modes". The operation modes thus far proposed are represented by: the twisted nematic (TN) mode using the nematic liquid crystal; the vertical alignment (VA) mode; the in-plane switch (IPS) mode; the surface stabilized-ferroelectric liquid crystal (SSFLC) mode using the smectic liquid crystal such as a ferroelectric liquid crystal or an anti-ferroelectric liquid crystal; or a tri-state switching mode.

The liquid crystal display device using these operation modes is constructed with a view to realizing and keeping the homogeneity of the picture quality, such that the spacing of a pair of substrates can be held uniform so as to improve the in-plane homogeneity of the transmittance characteristics of the liquid crystal display panel (or the liquid crystal panel) to the applied voltage or so as to improve the response characteristics homogeneity of the liquid crystal to the applied voltage by the entirety of the liquid crystal display device. Where the smectic longitudinal direction, as represented by the non-threshold value anti-ferroelectric liquid crystal or a mono-stabilized ferroelectric liquid crystal, is applied to the display device, moreover, it is essential to make a remarkably narrow cell gap (1 to 2 microns).

In order to realize this, the liquid crystal display device combines a polarizing plate and a back light, if necessary, and by incorporating the integrated structure into the display unit so as to exploit the structure.

FIG. 13 presents a top plan view of the liquid crystal display device of the prior art and a sectional view taken along a dotted line A–A' from the top plan view. This liquid crystal display device is constructed such that a liquid crystal 1014 is held at a constant spacing of about 10 microns or less by a paired substrates 1000 and 2001, one of which is transparent. In order to apply an electric field to the liquid crystal 1014, moreover, a pixel electrode 1007 made of a conductive thin film is formed over the surface of the substrate 1000, and an opposed electrode 1006 made of a conductive thin film is formed over the surface of the substrate 2001. The substrate 1000 having a display pixel portion 1003, a peripheral drive circuit 1004 and an external leading wiring line portion 1005 will be called the "active matrix substrate 1001". The display pixel portion will also be merely called the "pixel portion". The peripheral drive circuit 1004 will be a general name of a gate wiring line side drive circuit 1004a and a source wiring line side drive circuit 1004b. In an X-direction from the gate wiring line side drive circuit 1004a, there are formed a plurality of gate wiring lines (although not shown) in the display pixel portion 1003. In a Y-direction from the source wiring line side drive circuit 1004b, there are formed a plurality of source wiring lines (although not shown) in the display pixel portion 1003. A layer insulating film (although not shown) is provided between the gate wiring line and the source wiring line. Over the substrate 1000 and the substrate 2001, respectively, there are formed an orientation film 1010 and an orientation film 1011.

In order to make uniform the substrate spacing between the active matrix substrate 1001 and an opposed substrate 1002, moreover, there are mounted on the substrates a number of spacers 1009 which are given an equal size against the force in a direction to narrow the substrate spacing. Moreover, it is an ordinary method to fix the substrates with a seal member 1012 so that the substrates may not separate each other. The seal member is exemplified by a thermoset resin such as an epoxy resin or a UV resin to be set with an ultraviolet ray. However, the seal member is made of an insulating material.

In order to adhere the active matrix substrate 1001 and the opposed substrate 1002, moreover, the seal member 1012 is formed to extend along the peripheral portion (or the external peripheral portion) of the region in which the paired substrates overlap, and to enclose at least the display pixel portion 1003. The seal member 1012 is made of an adhesive. It is ordinary to set the line width of the pattern of the seal member 1012 to a constant value of about 1 to 4 mm. The seal member 1012 has an additional function to seal the liquid crystal from leaking to the outside of the panel other than that for the adhesion.

In order to arrange the liquid crystal in the liquid crystal display device, the liquid crystal is injected from an injection port 1013 by a vacuum injection method thereby to fill the display device with itself. After the liquid crystal was fully injected into the liquid crystal display device, the injection port 1013 is closed with an ultraviolet setting type resin 1015 so that the liquid crystal may not leak from the injection port 1013.

As has been described hereinbefore, it can be said that the liquid crystal constructing the liquid crystal display device contacts mainly with the orientation film and the seal member.

Only the orientation regulating force (In the specification, it means a force to regulate the liquid crystal molecules to be oriented in an uniform direction.) of the orientation film has not been sufficient to exert the regulating force so far as to the bulk the liquid crystal so that a homogeneous orientation has been difficult. Therefore, a black display cannot be obtained when no voltage is applied to block the improvement in contrast. Moreover, the smectic liquid crystal such as the ferroelectric liquid crystal or the anti-ferroelectric liquid crystal has a far higher viscosity at the room temperature than that of the nematic liquid crystal. When the orientation of the liquid crystal is partially disturbed, therefore, the orientation of that portion is left disturbed. When the orientation-disturbed region extends to that of the display pixel portion, its contrast is seriously deteriorated.

On the other hand, the liquid crystal in the vicinity of the seal member is subject to the regulating force of the seal member rather than to the regulating force of the orientation film. Even in the display pixel portion, as the case may be, the regulating force of the seal member may be stronger than the orientation regulating force of the orientation film.

Moreover, the smectic liquid crystal, as represented by the ferroelectric liquid crystal or the anti-ferroelectric liquid crystal, must have a very small cell gap (1 to 2 microns). With this cell gap of about 1 to 2 microns, the unnecessary seal member oozes like beard sideway of the pattern which intrinsically should be so. In the serious case, there is found a defect that the unnecessary seal member spreads to the display pixel portion.

Against this problem, there has been adopted the method of mixing a generally spherical material (as will be called the "filler") having an average particle diameter of about 3 to 4 microns into the resin material to increase the apparent viscosity thereby to prevent the viscosity at the panel heating time from lowering. Where the gap (or the substrate spacing) has to be made smaller, however, there arises a contradiction that the filler obstructs the reduction of the gap. This contradiction could be eliminated if a seal member containing a filler having a small average diameter were used. As a matter of fact, there has not been completed yet the seal member which contains a filler having an average particle diameter of 3 microns or less.

SUMMARY OF THE INVENTION

In order to solve the problems thus far described, the present invention has an object to provide a technique capable of providing not only a liquid crystal display device which has an excellent production yield without the orientation defect but also a method of manufacturing the liquid crystal display device.

According to the present invention, there is provided a liquid crystal display device which comprises an orientation regulating member comprising a trunk portion and a branch portion on the inner side of a seal material. The orientation regulating member comprises the trunk portion formed along an inner side of the seal material and the branch portion protruded from the trunk portion. A longitudinal direction of the branch portion is aligned with that of oriented liquid crystal molecules. However, preferably, an angle made between the longitudinal direction of the branch portion and a longer axis direction of oriented liquid crystal molecules is within ±5 degrees.

Note that there is such a case that the longitudinal direction of oriented liquid crystal molecules coincide with a direction of an orienting treatment.

The branch portion arrays the longitudinal direction of the liquid crystal molecules in parallel with a wall of the branch portion. In the orientation regulating member, the portions to contact with the liquid crystal will be called the "walls". The branch portion of the orientation regulating member of the present invention is more effective for improving the contrast more than expected. If the spacer is so disposed on the inner side of the orientation regulating member as to align the longitudinal direction of the branch portion of the orientation regulating member and the longitudinal direction of the spacer, moreover, the longer axis direction of the liquid crystal molecules can be promoted in the direction to be oriented. Moreover, the orientation regulating member of the present invention has a trunk portion for preventing the migration, as might otherwise be caused by the degradation of the seal member, of the seal member into the liquid crystal not only to enhance the mechanical strength but also to reduce the use of the liquid crystal.

In order to realize this object, according to the present invention, there is provided a liquid crystal display device comprising: a pair of substrates, at least one of which is transparent; and a seal member interposed between the paired substrates. The liquid crystal display device is characterized by further comprising: an orientation regulating member including a trunk portion formed along the inner side of said seal member, and a branch portion protruded from said trunk portion; and a liquid crystal filling the inner side of said orientation regulating member.

In order to realize the object, moreover, according to the present invention, there is provided a liquid crystal display device comprising: a pair of substrates, at least one of which is transparent; and a seal member interposed between the paired substrates. The liquid crystal display device is characterized: by further comprising an orientation regulating member formed on the inner side of the region having said seal member and contacting with said seal member, and a liquid crystal filling the inner side of said orientation regulating member; and in that said orientation regulating member includes a trunk portion and a branch portion.

Moreover, a liquid crystal display device having the aforementioned individual constructions is characterized in that an angle θ made between the trunk portion and the branch portion of said orientation regulating member is within a range of 0.1 to 179.9 degrees, preferably 40 to 140 degrees.

Moreover, a liquid crystal display device having the aforementioned individual constructions is characterized in that the width of said branch portion is within a range of 2 to 20 microns.

Moreover, a liquid crystal display device having the aforementioned individual constructions is characterized in that the distance between a side which is the closest to the trunk portion among four sides of the branch portion and said trunk portion is within a range of 5 to 15 mm.

Moreover, a liquid crystal display device having the aforementioned individual constructions is characterized: by further comprising a spacer for keeping constant the spacing between said paired substrates; and in that the longitudinal direction of the branch portion of said orientation regulating member is aligned with that of said spacer.

Moreover, a liquid crystal display device having the aforementioned individual constructions is characterized in that the longitudinal direction of the branch portion of said orientation regulating member is aligned with the direction for the orienting treatment.

Moreover, a liquid crystal display device having the aforementioned individual constructions is characterized in that the longitudinal direction of said spacer is aligned with the direction for the orienting treatment.

Moreover, a liquid crystal display device having the aforementioned individual constructions is characterized: by further comprising an electrode disposed on at least one substrate and having concaves; and in that the longitudinal direction of said concaves is aligned with that of the branch portion of said orientation regulating member.

Moreover, a liquid crystal display device having the aforementioned individual constructions is characterized: by further comprising an electrode disposed on at least one substrate and having concaves; and in that the longitudinal direction of said concaves is aligned with that of the branch portion of said spacer.

Moreover, a liquid crystal display device having the aforementioned individual constructions is characterized in that said concaves are formed in the same direction of a second wiring line. As a result, it is possible to avoid the intersection between a step and the concaves.

Moreover, a liquid crystal display device having the aforementioned individual constructions is characterized in that said liquid crystal is an anti-ferroelectric liquid crystal. Where this anti-ferroelectric liquid crystal is applied to the display device, it may cause a dislocation angle. According to the orientation regulating member of the present invention, however, there is a higher effect for improving the contrast more than expected.

Moreover, a liquid crystal display device having the aforementioned individual constructions is characterized in that said orientation regulating member is composed mainly of an acrylic resin.

Moreover, a liquid crystal display device having the aforementioned individual constructions is characterized in that said orientation regulating member is composed mainly of an epoxy resin.

BRIEF DESCRIPTION OF THE DRAWINGS

FIGS. 3A and 3B are diagrams showing concaves in the surface of a pixel electrode of the present invention;

FIGS. 4A to 4C are sectional views of an opposed substrate of the present invention;

DESCRIPTION OF THE PREFERRED EMBODIMENTS

Specific examples of the present invention will be described with reference to the accompanying drawings.

Figure 1A:
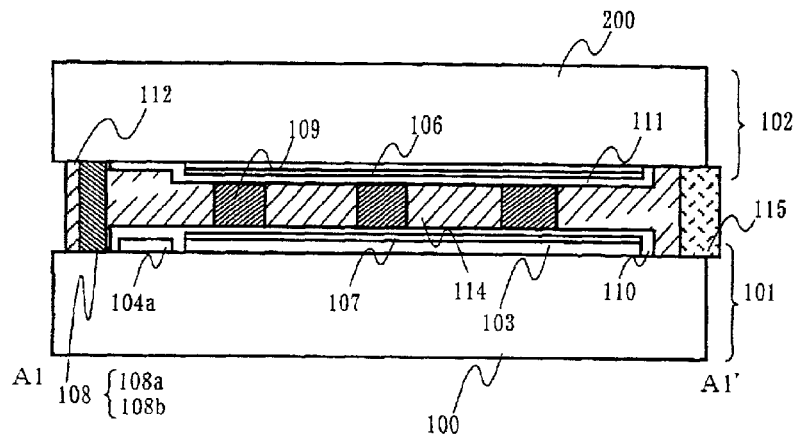
FIGS. 1A to 1C are diagrams showing a liquid crystal display device (of Embodiment 1) of the present invention.
Figure 1B:
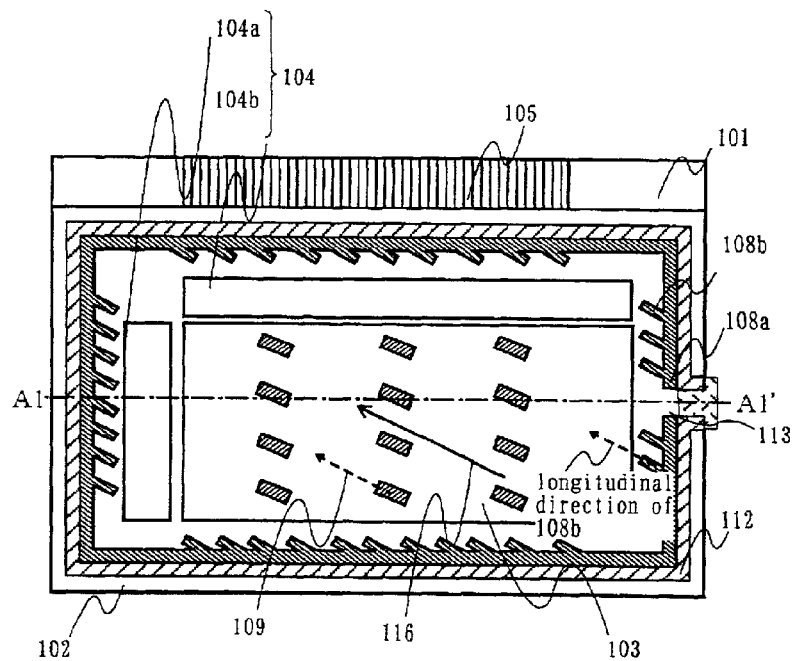
Figure 1C:
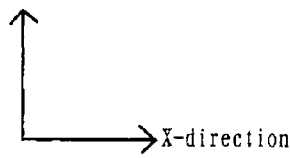
Figure 1C:
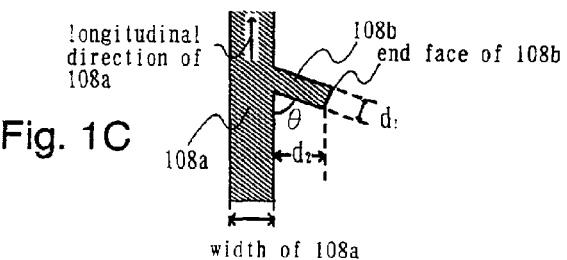
Figure 2A:
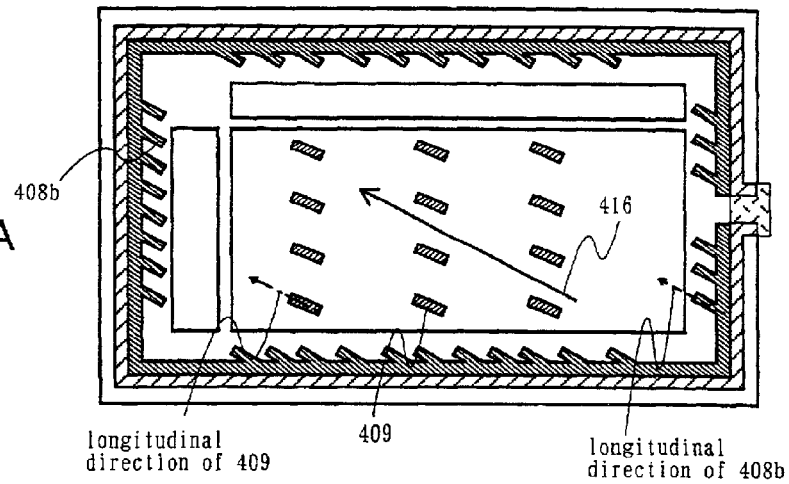
FIGS. 2A to 2C are diagrams showing the shapes of an orientation regulating member.
Figure 2B:
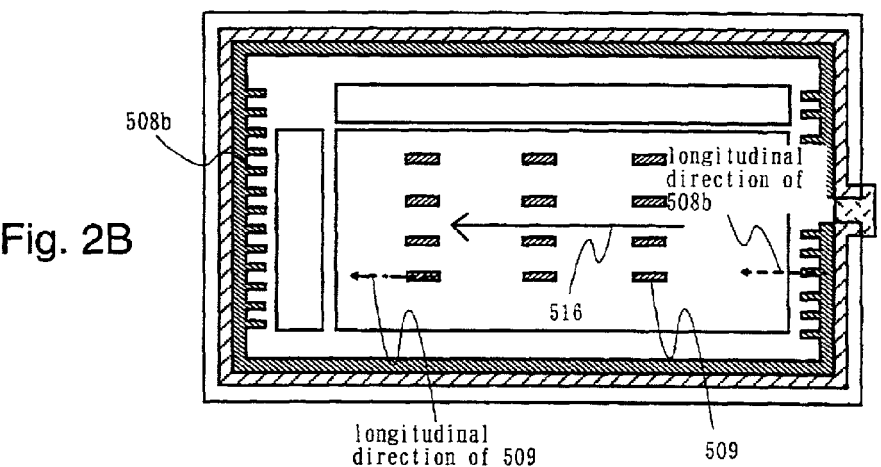
Figure 2C:
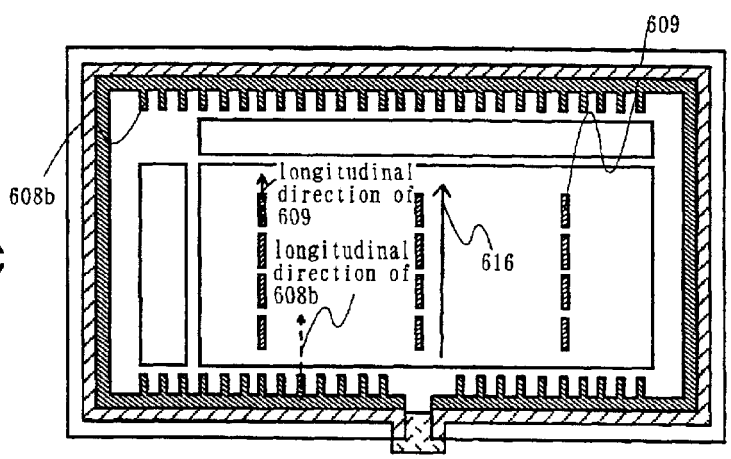
Figure 5A:
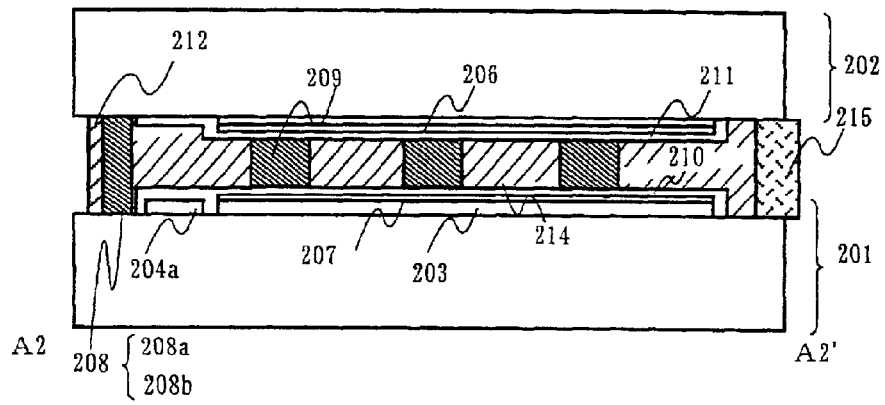
FIGS. 5A and 5B are diagrams showing a liquid crystal display device (of Embodiment 4) of the present invention.
Figure 5B:
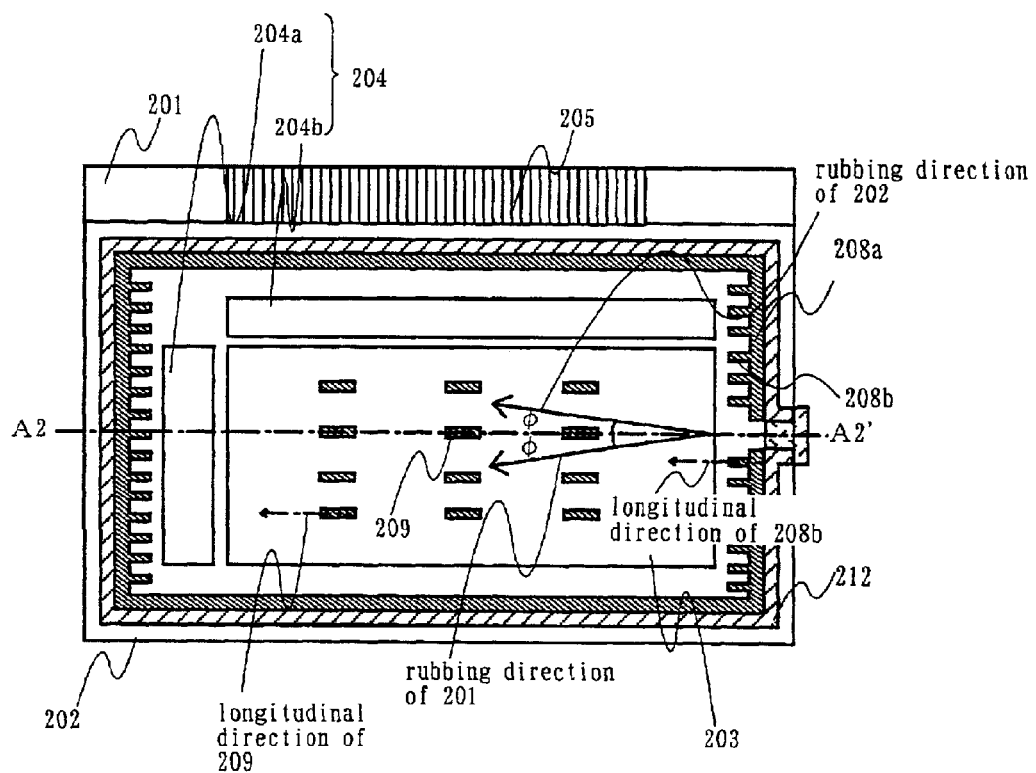
Figure 6:
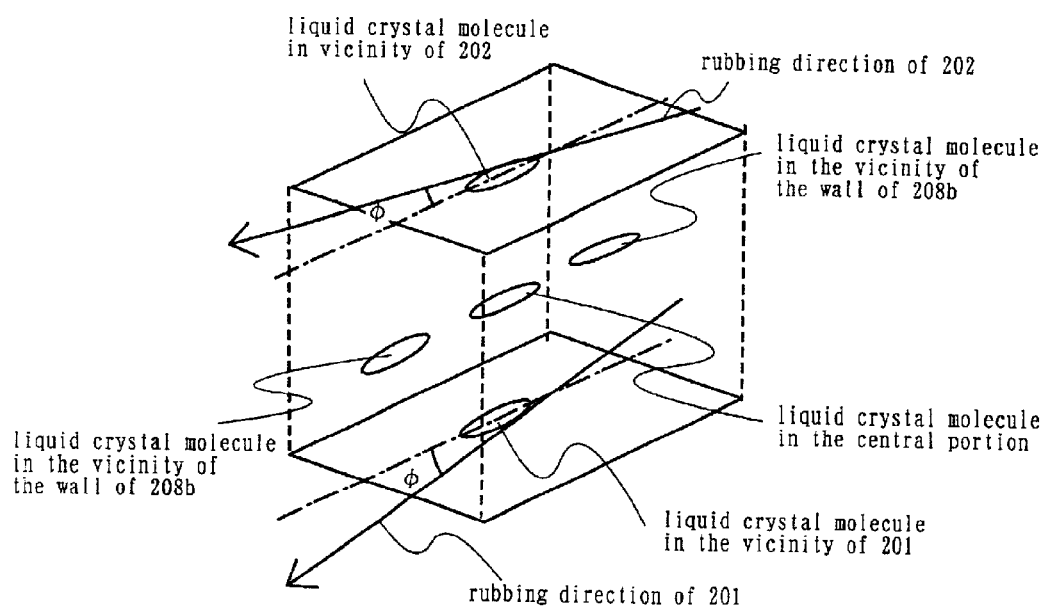
FIG. 6 is a diagram showing the direction of a liquid crystal molecule.
Figure 7A:
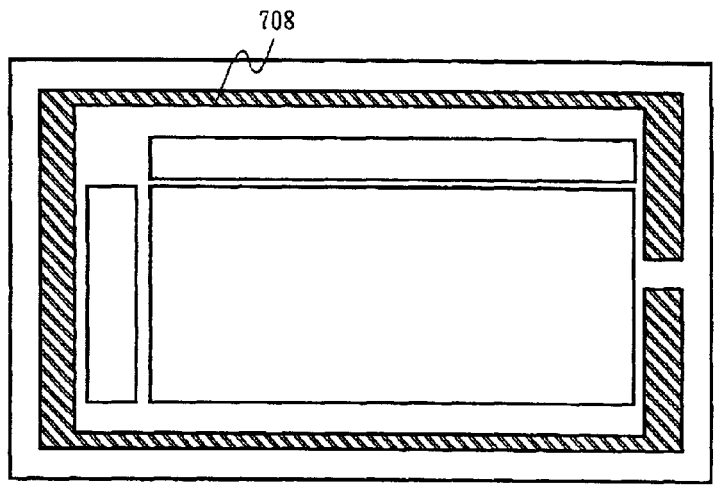
FIGS. 7A to 7C are diagrams showing steps of manufacturing a liquid crystal display device (of Embodiment 5) of the present invention.
Figure 7B:
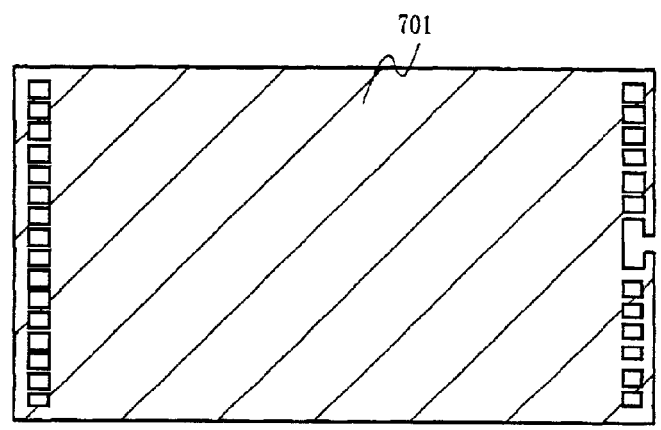
Figure 7C:
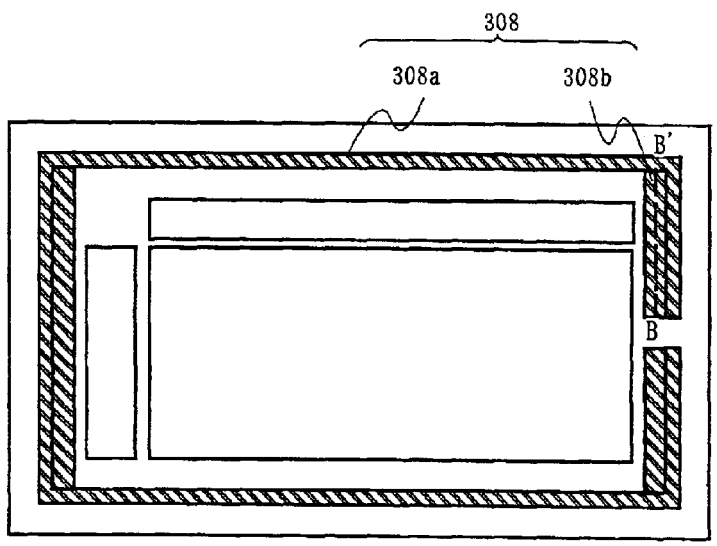
Figure 7C:
Figure 8A:
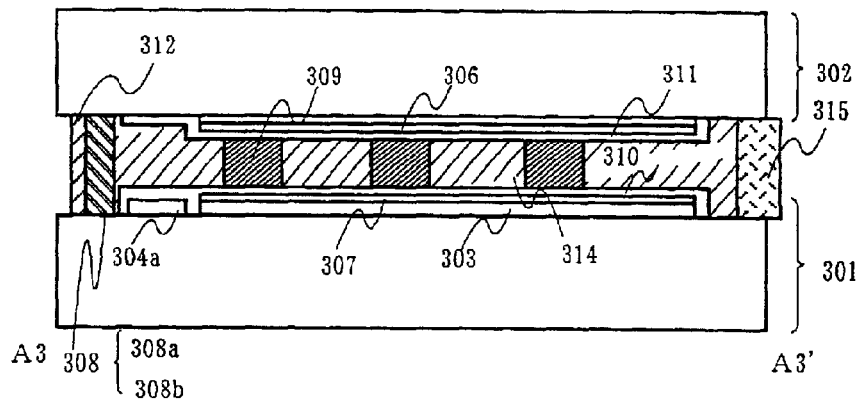
FIGS. 8A to 8C are diagrams showing the liquid crystal display device (of Embodiment 5) of the present invention.
Figure 8B:
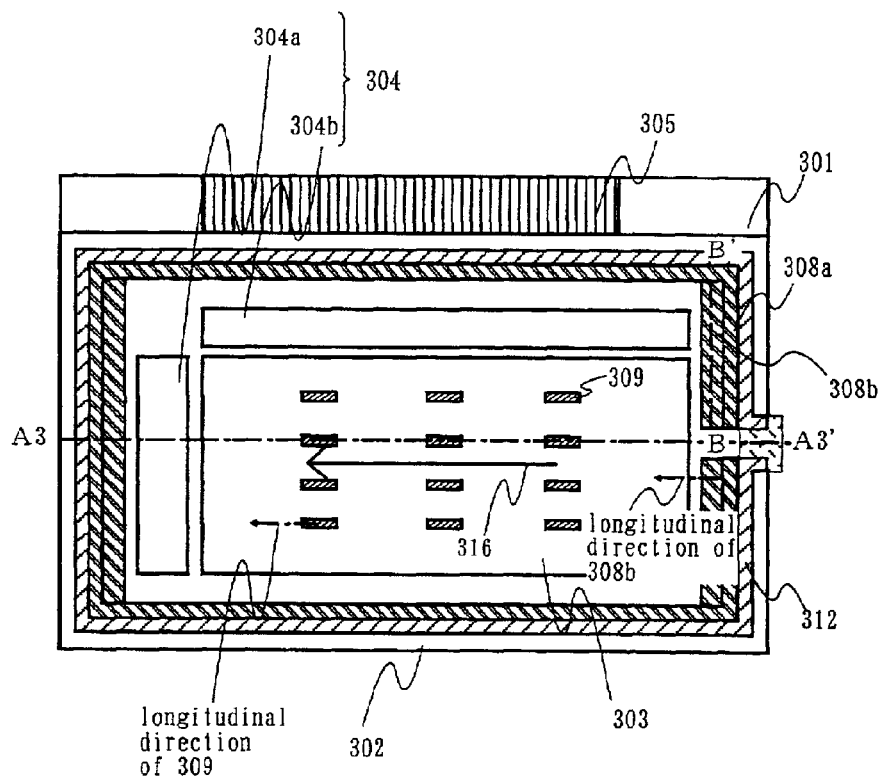
Figure 8C:
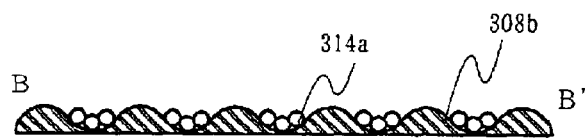

FIGS. 1A to 1C are diagrams showing a liquid crystal display device (of Embodiment 1) of the present invention. FIGS. 2A to 2C are diagrams showing the shapes of an orientation regulating member. FIGS. 3A and 3B are diagrams showing concaves in the surface of a pixel electrode of the present invention. FIG. 4A is a sectional view showing an opposed substrate of the present invention, and FIGS. 4B and 4C is an enlarged diagram showing the surface of an opposed electrode over the opposed substrate. FIGS. 5A and 5B are diagrams showing a liquid crystal display device of Embodiment 4. FIG. 6 is a diagram showing the direction of a liquid crystal molecule of the liquid crystal display device of Embodiment 4. FIGS. 7A to 7C are diagrams showing steps of manufacturing a liquid crystal display device of Embodiment 5. FIGS. 8A to 8C are diagrams showing the liquid crystal display device of Embodiment 5. FIGS. 9A to 9F to FIGS. 12A to 12D are diagrams showing examples of electronic devices.

[Embodiment 1]

A method of manufacturing a liquid crystal display device of the present invention will be described with reference to FIGS. 1A to 1C to FIGS. 4A to 4C. In order to manufacture the liquid crystal display device of the present invention, there are used an active matrix substrate 101 and an opposed substrate 102. The active matrix substrate 101 is made of glass or quartz to have an insulating property. Over this active matrix substrate 101, there are formed over a transparent substrate 100: a display pixel portion 103; a peripheral drive circuit 104 composed of a gate wiring side drive circuit 104a and a source wiring side drive circuit 104b; and an external leading wiring portion 105. In the display pixel portion 103, moreover, there are formed a pixel TFT (including at least a gate electrode, a source electrode and a drain electrode), a holding capacitor, a gate wiring line, a source wiring line, a drain wiring line, an layer insulating film and so on), all of which are not shown for simplicity. The peripheral drive circuit 104 is a general name of the gate wiring side drive circuit 104a and the source wiring side drive circuit 104b. A plurality of gate wiring lines are formed in the display pixel portion 103 in an X-direction from the gate wiring side drive circuit 104a. In the display pixel portion 103, on the other hand, a plurality of gate wiring lines are formed in a Y-direction from the source wiring side drive circuit 104b. The display pixel portion 103 is constructed such that the layer insulating film is formed on the gate wiring line for preventing the short-circuit, and such that the source wiring line is formed over the layer insulating film. Here, the gate wiring line will be called the first wiring line, and the source wiring line will be called the second wiring line, as named in the order from the substrate.

The opposed substrate 102 is a substrate opposed to the active matrix substrate 101 and made of glass or quartz to have an insulating property. Over a transparent substrate 200, as shown in FIG. 4A, there are formed: an opposed electrode 106; a color layer 403 composed of a color layer 403a having a red pattern, a color layer 403b having a green pattern and a color pattern 403c having a blue pattern; a shielding film 402; a flattened film 404; and so on.

A pixel electrode 107 is formed in the display pixel portion 103 by forming a transparent conductive film (having a film thickness of 110 nm) all over the active matrix substrate 101 and by patterning it using a photomask. The pixel electrode 107 can be formed by a sputtering method or vacuum evaporation method using indium oxide ($In_2O_3$) or an alloy of indium oxide-tin oxide ($In_2O_3$—SnOn: ITO film). This material is etched with a solution of hydrochloric acid. However, especially the etching of the ITO film is liable to produce a residue. Therefore, an alloy of indium oxide-zinc oxide ($In_2O_3$—ZnO) may be used to improve the etching workability. The indium oxide-zinc oxide alloy is excellent in the surface smoothness and in the thermal stability for the ITO film so that an Al film can be prevented from being corroded in contact with the pixel electrode on the end face of the drain wiring line. Likewise, the zinc oxide (ZnO) is also a proper material, and zinc oxide having gallium (Ga) contained can be used to enhance the transmittance and conductivity of a visible light.

Next, an orientation regulating member 108 and a spacer 109 are individually patterned into predetermined shapes by a photolithographic method.

The orientation regulating member 108 is composed of a trunk portion 108a and a branch portion 108b. In the orientation regulating member 108, as shown in FIG. 1, the trunk portion 108a and the branch portion 108b may be formed by using such a photomask that the trunk portion 108a may be on the inner side of a region for forming a seal member at a later step between the substrates whereas the branch portion 108b may has its longitudinal direction aligned with a rubbing direction at a later step. Specifically, the trunk portion 108a of the orientation regulating member may have a width of about 1 to 4 mm. As shown in FIG. 1C, the orientation regulating member has the branch portion 108b which is raised in a direction θ from the trunk portion 108a. In other words, this angle θ is made by the trunk portion 108a and the branch portion 108b. The angle θ is set to a value of about 0.1 to 179.9 degrees, preferably about 40 to 140 degrees. If the branch portion 108b of the orientation regulating member has a width d1, moreover, this width d1 is set to about 2 to 20 microns. That face of the branch portion 108b of the orientation regulating member which is the remotest from the trunk portion 108a will be called the "end face". If the distance between the nearest side of the four sides of the end face to the trunk portion 108a and the trunk portion 108a is designated d2, this value d2 is set to about 5 to 15 mm. Moreover, the orientation regulating member may be formed to have such as end face of the branch portion that it may be aligned, as the active matrix substrate 101 is seen in a normal direction (to see the display), with the longitudinal direction of the trunk portion of the orientation regulating member.

The spacer 109 may also be formed by using a photomask which has a longitudinal direction aligned with the rubbing direction of a later step. Where an orientation regulating member is to be formed to have such an end face of its branch portion as is aligned with the longitudinal direction of the trunk portion thereof, the spacer is desirably designed such that the longitudinal direction of the trunk portion of the orientation regulating member may be aligned with the short sides of the spacer. In this case, the spacer takes a parallelogram shape (to have sections parallel to the surface of the substrate 100), as the active matrix substrate 101 is seen in the normal direction (to see the display).

In the orientation regulating member 108, therefore, the direction for the branch portion 108b to extend may be aligned with the direction of the later-described rubbing treatment. Moreover, the spacer 109 may be aligned in its longitudinal direction with the direction of the later-described rubbing treatment. Considering the application of the present invention to a projector, therefore, it is possible to use the orientation regulating member in which a branch portion 408b and a spacer 409 are extended in their longitudinal directions on a diagonal line (or in a rubbing direction 416), as shown in FIG. 2A. As shown in FIG. 2B, a branch portion 508b of the orientation regulating member and a spacer 509 may be extended in their longitudinal directions from an injection entrance to the opposite sides (i.e., from east to west: in a rubbing direction 516). As shown in FIG. 2C, a branch portion 608b of the orientation regulating member and a spacer 609 may be extended from south to north (i.e., in a rubbing direction 616). In FIGS. 2B and 2C, the influence of the step is preferably reduced if the branch portion 108b is formed in the same direction as that of the second wiring line (or the source wiring line). However, the orientation regulating member should naturally be unlimited to those shapes, but the branch portions are not consciously formed near the four corners of the orientation regulating member, because the injection failure of the liquid crystal easily occurs. The external leading wiring line is omitted from FIGS. 2A to 2C.

As the material for the orientation regulating member 108, there is used the NN700 (made by JSR) which is composed mainly of a photosensitive acrylic resin. The film thickness is set, after baked, to about 3.4 to 3.6 microns. The NN700 is exposed, after formed and tentatively baked, to a mask aligner using a photomask. Specifically, the acrylic resin is exposed to the aperture of the photomask. Next, the exposed acrylic resin is developed to a developer composed mainly of TMAH (Tetra Methyl Ammonium Hydroxide), and the dried substrate is baked at 250° C. for one hour. As a result, there are individually formed the wall-shaped orientation regulating member 108 along the peripheral portion (or the outer periphery) of the substrate, and the columnar spacer 109, as shown in FIG. 1B. The height of the orientation regulating member 108, after baked, is about 3.2 to 3.4 microns. The width d1 of the branch portion 108b of the orientation regulating member is set to 2 to 20 microns, and the spacing (or pitch) from another branch portion is set to about 0.5 mm.

The spacer 109 is formed by a method similar to that of the orientation regulating member 108. The height of the spacer 109 may be a difference of that of orientation regulating member 108 from the film thicknesses of the layer insulating film (1.8 to 2 microns), the orientation film (0.05 microns), the pixel electrode (0.11 microns) and so on, and is about 1.4 to 1.6 microns. The longer and shorter sides of the spacer 109 are set to lengths of 4 microns and 1 micron, respectively. Moreover, the spacer 109 is desirably formed in the shielding portion of the pixel TFT and the holding capacitor other than the aperture. Here, the direction parallel to the longer sides of the spacer 109 will be called the "longitudinal direction of the spacer 109".

Next, an orientation film 110 and an orientation film 111 are applied to the active matrix substrate 101 and the opposed substrate 102, and are baked. These orientation film 111 and orientation film 110 are made of RN1286 (of Nissan Kagaku). The orientation film 110 and the orientation film 111 are applied to predetermined regions on the active matrix substrate 101 and the opposed substrate 102 by a flexographic printing method. The thickness of the orientation film 110 and the orientation film 111 are set, after baked, to about 50 nm. The orientation film 110 and the orientation film 111 are pre-baked by a hot plate of 80° C. for 90 seconds. and is then baked in a clean oven at 250° C. for 1 hour.

After the application of the orientation film, the orientation film 110 on the active matrix substrate 101 and the orientation film 111 on the opposed substrate 102 are rubbed to orient the liquid crystal molecules at a constant pre-tilt angle. In the present embodiment, the rubbing direction is aligned with that of the orienting treatment. The dust or the fur of the rubbing cloth, as caused by the rubbing treatment, is removed by an ultrasonic cleaning method.

After this, the opposed substrate 102 is provided with a thermoset seal member 112 (e.g., XN-21S of Mitsui Kagaku) on the outer side of the orientation regulating member 108 by a dispenser drawing method. The seal member contains a solvent and a hardening agent to improve the protrusion of an epoxy resin and a flow preventing filler and a set promoting agent to promote the reaction between the epoxy resin and the hardening agent.

The width of the seal member 112 is formed, after adhered and thermally pressed, to 1.2 to 1.5 mm. The pattern of the seal member 112 is provided at its portion with an injection port 113, into which the liquid crystal is injected. The seal member 112 is baked, after formed, at 90° C. for about 0.5 hours. By this baking treatment, the solvent for improving the protrusion volatilizes.

The active matrix substrate 101 and the opposed substrate 102 thus having passed through the foregoing steps are so registered that the oriented faces may be opposed to each other, and are then precisely adhered to each other. The rubbing direction 113 of the active matrix substrate 101 and the rubbing direction 113 of the opposed substrate 102 are aligned. The paired substrates thus adhered are subjected to a pressure of 0.3 to 1.0 Kgf/cm$^2$ in a direction normal to the substrate face and are simultaneously hot-pressed at 160° C. for about 2 hours in a clean oven thereby to promote the setting reaction of the seal.

The paired substrates adhered are awaited till they cool down, and are then divided to a desired size by means of a scriber and a break machine. The scriber is a device for dividing the adhered substrate. On the other hand, the break machine is a device for dividing the adhered substrates on the side opposed to the side streaked by the scriber, so as to enlarge the streaks. The cutter pressure of the scriber is 0.6 to 0.8 Kgf/cm$^2$ for a glass substrate and 1.1 to 1.2 Kgf/cm$^2$ for a quartz substrate, and the divisions are made by setting the depth to about 0.1 mm.

The liquid crystal is injection from the injection port by a vacuum injection method. A divided panel is prepared in the liquid crystal injection device (or the vacuum chamber), and the inside of the liquid crystal injection device (or the vacuum chamber) is evacuated at 110° C., to a vacuum state of about $1.33 \times 10^{-7}$ Pa from $1.33 \times 10^{-5}$ Pa so that the liquid crystal is defoamed to remove the air or the like dissolved in the liquid crystal (or inside). After this, the inside of the vacuum chamber is cooled to the vicinity of 80° C., and the injection port 113 is dipped in the (not-shown) liquid crystal dish heaped with the liquid crystal. The liquid crystal used in the present embodiment is CS-2003 (of Chisso Sekiyu Kagaku). The inside of the liquid crystal injection device (or the vacuum chamber) is set at near 80° C. so that the CS-2003 is injected in the state of chiral-nematic liquid crystal.

Next, the liquid crystal injection device (or the vacuum chamber) in the vacuum state is gradually leaked with nitrogen to the atmospheric pressure. By the actions of the pressure difference between the pressure in the panel and the atmospheric pressure and the capillary phenomenon of the liquid crystal, the liquid crystal is then injected into the injection port 113 of the panel (or the liquid crystal panel) so that it gradually advances from the injection port 113. When it is confirmed that the inside of the orientation regulating member 108 is filled up with the liquid crystal 114, the cooling is made at a rate of 0.1 to 1.0° C./min. to a temperature range indicating the SmC*phase (i.e., the chiral-smectic C phase), e.g., to 50° C. After this, a cooling is made at a rate of 5.0 to 10° C./min. to a temperature range indicating the N*phase (i.e., the chiral-nematic phase), e.g., to 80° C., and a cooling is finally made at a rate 0.1 to 1.0° C./min. to a temperature range indicating the SmC*phase (i.e., the chiral-smectic C phase), e.g., to 25° C.

As the cooling of the liquid crystal 114 advances, the orientation regulating force of the orientation film 110, the orientation film 111 and the orientation regulating member 108 proceed re-orientation from the liquid crystal molecules in the vicinity of them as the nuclei toward the central portion of the region between the active matrix substrate 101 and the opposed substrate 102. At the central portion between the active matrix substrate 101 and the opposed substrate 102, there are jointed the smectic layer which has advanced in the re-orientation from the orientation film 110 of the active matrix substrate 101 and the smectic layer which has advanced in the re-orientation from the orientation film 111 of the opposed substrate 102. In parallel with the wall of the branch portion 108b of the orientation regulating member and the wall of the spacer 109, however, the liquid crystal is arranged such that its molecules are aligned in their longitudinal direction (or the rubbing direction 116) with the longitudinal direction of the branch portion 108b of the orientation regulating member and the longitudinal direction of the spacer 109. Therefore, the continuity of the array of the liquid crystal molecules is further promoted. The portions where the liquid crystal and the orientation regulating member or the spacer contact will be called the "wall". Therefore, the exertion of the orientation regulating force is promoted to the bulk of the liquid crystal (i.e., the bulk of the liquid crystal absent from the vicinity of the orientation film) to realize the homogeneous array of the liquid crystal molecules so that a liquid crystal having little orientation defect can be obtained.

The liquid crystal display device (or the liquid crystal panel) is pressed on its two sides by a homogeneous force in directions normal to the sides. After 15 minutes, the liquid crystal to flow over the injection port 113 is wiped off. Under this pressure, an ultraviolet setting type resin 115 is applied to the injection port 113, and the pressure is reduced. Then, this ultraviolet setting type resin 115 invades. In this state, this resin 115 is set by irradiating it with an ultraviolet ray (of 4 to mW/cm$^2$ for 120 secs.) thereby to seal the injection port 110. This, there is obtained the liquid crystal display device, as shown in FIG. 1. FIGS. 1A and 1B are a top plan view of the liquid crystal display device and a sectional view taken along dotted lines A1 to A1' of the top plan view.

Next, the liquid crystal having stuck to the substrate surface and end faces is cleaned with acetone and ethanol, for example. However, the external leading wiring portion 105 is cleaned only with ethanol.

Next, the FPC (although not shown) is connected with the external leading wiring portion 105 through an anisotropic conductive adhesive (although not shown) by the thermocompression bonding (at 290° C. and under pressure of 50 to 70 KPa). Moreover, polarizing sheets are adhered to the two faces of the liquid crystal display device of FIG. 1 to complete the liquid crystal display device. These adhesions are made such that the rubbing direction of the substrate on the incident side of an incoming light is parallel to the transmittance axis of the polarizing sheets, and such that the transmittance axis is perpendicular to that of the polarizing sheets on the side through which the transmitted light passes.

The measurements of the liquid crystal display device are done by using a reset drive to apply pulses having equal absolute values of a positive polarity and a negative polarity. The display is the darkest, when the applied voltage is 0 V, but is the brightest when the director of the liquid crystal is positioned in the direction of 45 degrees with respect to the rubbing direction. Similar tendencies are found even for the triangular-wave drive.

In the method of manufacturing the liquid crystal display device of the present invention, the columnar spacer and the orientation regulating member are formed at the diffferent steps, but the orientation regulating member may be formed simultaneously with the columnar spacer. However, a step is formed between the portion where the columnar spacer is formed and the portion where the orientation regulating member is formed. Therefore, a spacer may be formed over the orientation regulating member.

In the display pixel portion 103 of the present embodiment, there is used the active matrix substrate 101 in which the layer insulating film is formed over the gate wiring line so as to prevent the short circuit, and in which the source wiring line is formed over the layer insulating film. However, there may be used an active matrix substrate 101 in which the layer insulating film is formed over the source wiring line and in which the gate wiring line is formed over the layer insulating film. In the active matrix substrate, therefore, the gate wiring line is the second wiring line.

The present embodiment has been described on the active matrix liquid crystal display device using the smectic liquid crystal. However, the present invention should not be limited thereto but can be applied to a liquid crystal display device in which the rubbing direction and the longitudinal direction of the liquid crystal molecule have to be aligned, such as the liquid crystal display device adopting the PS-FLC (Polymer Stabilized-Ferroelectric Liquid Crystal) method, the OCB (Optically Compensated Birefrigence) method or the VA (Vertical Alignment) method. If a comb-like electrode is formed over the substrate, the present invention can also be applied to the IPS (In Plane Switching) method of driving the liquid crystal with a transverse electric field.

In the present embodiment, the orientation regulating member 108 and the spacer 109 are formed over the active matrix substrate 101 by the photolithographic process. However, the orientation regulating member or the spacer may be formed over the opposed substrate 102. Where the orientation regulating member is formed over the opposed substrate 102, however, it is desired to form the seal member 109 over the opposed substrate 102.

The spacer 109 is formed after the orientation regulating member 108 in the present embodiment but may also be formed before the orientation regulating member 108.

The column-shaped (or wall-shaped) spacer is used in the present embodiment, but a spherical spacer may also be formed.

In the present embodiment, the rubbing treatment is done from the side of the injection port to the opposed side. It is, however, natural that the rubbing treatment can be done from the opposed side of the injection port to the side of the injection port.

The active matrix substrate 101 and the opposed substrate 102 are combined and adhered in parallel with the rubbing direction in the present embodiment but may also be adhered in opposite parallel.

For the orienting treatment, there may also be used a vapor deposition method or an optical orientation method using silicon dioxide. Without the orienting treatment, there may also be used ribs or an oblique electric field.

The dispense drawing method is used at the time of forming the seal member in the present embodiment, but a screen printing method may also be used.

In the present embodiment, there is used the CS-2003 (of Chisso Sekiyu Kagaku), to which the present invention should naturally be unlimited. The phase transition series of the CS-2003 indicates Iso (Isotropic Phase)-N*(Chiral-Nematic Phase)-SmC*(Chiral-SmecticCPhase)Cry (CrystalPhase). The phase transition temperatures of the liquid crystal will be indicated by numerical values in the following: Iso (90) N*(64)SmC*(−14)-Cry.

In the present embodiment, the re-orientation of the liquid crystal has been made by the aforementioned method. However, there may also be adopted the re-orientation methods according to the various liquid crystals.

The dipping method is used as the liquid crystal injecting method in the present embodiment, but there may be used the dripping injection method of dripping the liquid crystal toward the injection port. Moreover, the ultraviolet setting resin may be used as the seal member so that the seal member may be treated by applying the liquid crystal between two substrates to adhere the substrates. With only the ultraviolet ray, however, a sufficient setting is hard to achieve. The setting reaction may be completed by heating the resin after the resin was substantially set and fixed. This injection method is called the "laminate method". This method needs no injection port. In short, it is possible to use the orientation regulating member of a pattern having the end portion and the end portion connected to each other.

In the present embodiment, though the trunk portion and the branch portion of the orientation regulating member 108 are formed simultaneously, they may be formed separately.

[Embodiment 2]

In Embodiment 1, the rubbing treatment has been done as the orienting treatment. In the present embodiment, however, here will be described a method of performing the orienting treatment by forming concaves in the electrode.

In Embodiment 1, the homogeneous orientation of the liquid crystals is realized with the orientation film oriented, the orientation regulating member and the spacer. In the present embodiment, however, the homogeneous orientation of the liquid crystals can be realized with concaves in the pixel electrode and the orientation regulating member.

Here, the remaining manufacture steps have already been described in Embodiment 1. Therefore, the detailed manufacture steps will be referred to those of Embodiment 1, the description of which will be omitted.

A pixel electrode is formed in the display pixel portion by forming a transparent conductive film (having a film thickness of 110 nm) all over the active matrix substrate and by patterning it using a photomask. The pixel electrode can be formed by a sputtering method or vacuum evaporation method using indium oxide ($In_2O_3$) or an alloy of indium oxide-tin oxide ($In_2O_3$—$SnO_2$: ITO film). This material is etched with a solution of hydrochloric acid. However, especially the etching of the ITO film is liable to produce a residue. Therefore, an alloy of indium oxide-zinc oxide ($In_2O_3$—$ZnO$) may be used to improve the etching workability. The indium oxide-zinc oxide alloy is excellent in the surface smoothness and in the thermal stability for the ITO film so that an Al film can be prevented from being corroded in contact with the pixel electrode on the end face of the drain wiring line. Likewise, the zinc oxide (ZnO) is also a proper material, and zinc oxide having gallium (Ga) contained can be used to enhance the transmittance and conductivity of a visible light.

Next, in order to form the concaves for orienting the liquid crystal, a second patterning is made using a new photomask to form a pixel electrode 907 having concaves in its surface, as shown in FIG. 3A. FIGS. 3A and 3B are sectional views taken by cutting the pixel electrode normal to the longitudinal direction of the branch portion of the orientation regulating member. The etching is so made that the concaves have a width of 2 microns, a spacing (or pitch) of 4 microns from another recess, and a depth of 10 to 20 nm, as shown in FIG. 3A. Although the present embodiment adopts the dry etching but may also adopt a wet etching. Where the wet etching is adopted, there are obtained concaves having gentle surfaces, as shown in FIG. 3B.

Next, there are done the steps used in Embodiment 1: the step of forming the orientation regulating member and the spacer; the step of forming the seal member along the peripheral portion (or the outer periphery) of the orientation regulating member; the step of adhering the active matrix substrate and the opposed substrate; the dividing step; and the step of injecting the liquid crystal. Here, the orientation regulating member and the spacer are so formed that the longitudinal direction of the branch portion of the orientation regulating member, the longitudinal direction of the gap member, and the longitudinal direction of the concaves may be aligned with one another. The branch portion of the orientation regulating member, the spacer and the concaves of the pixel electrode promote the liquid crystal molecules to be oriented in the longitudinal direction of the concaves. Next, the sealing step with the ultraviolet setting type resin, the rising and re-orienting step, and the step of connecting the FPC with the external leading wiring portion are passed to produce the liquid crystal display device of the present invention.

Where the present embodiment is used, the orientation film used in Embodiment 1 can be eliminated to solve the problems the dust or the static electricity, according to the rubbing treatment.

A homogeneous orientation of the liquid crystal can be obtained by the effects of the orientation regulating member, the spacer and the concaves of the present invention.

The shape of the cross-section of the concaves may be any of rectangle, triangle, trapezoid, sine wave and analogues thereto.

In the active matrix substrate, the second wiring line is formed over the first wiring line over the substrate through the layer insulating film, and the concaves may be formed along the second wiring line. Then, it is possible to avoid the intersection between the step and the recess. Where the gate wiring line is adopted as the first wiring line, the second wiring line is the source wiring line. Where the source wiring line is adopted as the first wiring line, on the contrary, the second wiring line is the gate wiring line.

Moreover, one substrate with the orientation film may be rubbed to form the concaves in the electrode of another substrate, and the two substrates may be adhered.

The manufacture method of the present embodiment can also be applied to the reflection type liquid crystal display device having a reflection electrode of aluminum, silver or the like.

[Embodiment 3]

Where the seal member is to be formed on the opposed substrate, it is desired to form the orientation regulating member on the opposed substrate. The present embodiment is exemplified by forming the orientation regulating member on the opposed substrate.

By the known method, there are formed over a substrate 201: a shielding film 202; a color layer 203 composed of a color layer 203a having a red pattern, a color layer 203b having a green pattern and a color layer 203c having a blue pattern; and a flattening film 204.

Next, a transparent conductive film is applied by a method similar to that used in Embodiment 1, to form the opposed electrode 106. There is obtained an opposed substrate, as shown in FIG. 4A.

Next, the orientation regulating member (although not shown) and the spacer (although not shown) are patterned to a predetermined by a photolithographic method similar to that used in Embodiment 1.

An orientation film is applied to the opposed substrate having the orientation regulating member and the spacer and is rubbed to form the seal member (although not shown) to the outer side of the orientation regulating member. By a method similar to that of Embodiment 1, the orientation regulating member and the active matrix substrate are adhered to complete the liquid crystal display device of the present invention.

Where the application of the orientation film is used for the orientation treatment, the flattening film may be formed after the opposed electrode was formed.

In the present embodiment, the surface of the opposed electrode is flattened, as shown in FIG. 4B, so as to apply the orientation film and to perform the rubbing as the orienting treatment. For this orienting treatment, there may be used the concaves of the electrode, as used in Embodiment 2. In this case, so as to form the concaves for orienting the liquid crystal in the opposed electrode, a new photomask is used to perform a second patterning treatment thereby to obtain the opposed electrode having the concaves, as shown in FIG. 4C.

[Embodiment 4]

Embodiment 1 has been described on the method of manufacturing a liquid crystal display device using the liquid crystal to cause no dislocation angle. In Embodiment 4, however, here will be described a method of manufacturing a liquid crystal display device using a liquid crystal to cause the dislocation angle.

Here, the remaining constructions have already been described in Embodiment 1. Therefore, the detailed constructions will be referred to those of Embodiment 1, the description of which will be omitted.

As the dislocation angle $\phi$, here will be defined the angle which is made by arraying the axis of the liquid crystal in a direction inclined by the angle $\phi$ with respect to the rubbing direction. For example, the MX-Z19 (i.e., an anti-ferroelectric liquid crystal) of Mitsubishi Kagaku causes a dislocation angle of 6 degrees. According to this definition, the liquid crystal of Embodiment 1 has a dislocation angle of 0 degrees.

There are prepared: the active matrix substrate 201 including a display pixel portion 203, a peripheral drive circuit 204, an external leading wiring line portion 205 and a pixel electrode 207; and an opposed substrate 202 including an opposed electrode 206.

By using a method similar to that of Embodiment 1, there are formed over the active matrix substrate 201 an orientation regulating member 208 including a trunk portion 208a and a branch portion 208b, and a spacer 209.

After this, an orientation film 210 is applied to the active matrix substrate 201. Next, this active matrix substrate 201 is subjected to a rubbing treatment in a direction dislocated by 6 degrees with respect to the longitudinal direction of the branch portion 208b of the orientation regulating member.

Likewise, an orientation film 211 is applied to the opposed substrate 202. Next, the opposed electrode 202 and the active matrix substrate 201 are, when adhered, subjected to a rubbing treatment in a direction dislocated by 6 degrees to the opposite side with respect to the rubbing direction of the active matrix substrate 201 by using the longitudinal direction of the branch portion 208b of the orientation regulating member as an axis of symmetry.

Next, a seal member 212 is formed on the opposed substrate 202, and this opposed substrate 202 is adhered to the active matrix substrate 201. Therefore, an angle of $2\phi=12$ degrees is made between the rubbing direction of the active matrix substrate 201 and the rubbing direction of the opposed substrate 202.

Next, a vacuum pressure injection method is done to fill the space between the active matrix substrate 201 and the opposed substrate 202 with a liquid crystal 214. After the end of the liquid crystal injection, the liquid crystal 214 is re-oriented.

As the cooling of the liquid crystal 214 advances, the orientation regulating force of the orientation film 210, the orientation film 211 and the orientation regulating member 208 proceed re-orientation from the liquid crystal molecules in the vicinity of them as the nuclei toward the central portion of the region between the active matrix substrate 201 and the opposed substrate 202. At the central portion between the active matrix substrate 201 and the opposed substrate 202, as shown in FIG. 6, there are jointed the smectic layer which has advanced in the re-orientation from the orientation film 210 of the active matrix substrate 201 and the smectic layer which has advanced in the re-orientation from the orientation film 211 of the opposed substrate 202. In parallel with the wall of the branch portion 208b of the orientation regulating member and the wall of the spacer 209, however, the liquid crystal is arranged such that its molecules are aligned in their longitudinal direction (as indicated by a dotted line in FIG. 7) with the longitudinal direction of the branch portion 208b of the orientation regulating member and the longitudinal direction of the spacer 209. Therefore, the continuity of the array of the liquid crystal molecules is further promoted. The portions where the liquid crystal and the orientation regulating member contact will be called the "wall". Therefore, the exertion of the orientation regulating force is promoted to the bulk of the liquid crystal (i.e., the bulk of the liquid crystal absent from the vicinity of the orientation film) to realize the homogeneous array of the liquid crystal molecules so that a liquid crystal having little orientation defect can be obtained.

After the cooling-down to 25° C. (or the room temperature), a sealing step using an ultraviolet setting type resin 215 and a cleaning step are performed to provide a liquid crystal display device shown in FIG. 5. After this, an FPC (although not shown) is connected with the external leading wiring line portion 205, and polarizing sheets are adhered to the two sides of the liquid crystal display device to complete the liquid crystal display device.

The orientation regulating member and the spacer of the present invention can also be applied to the liquid crystal display device having the dislocation angle, as has been described hereinbefore.

In the present embodiment, the dislocation angle $\phi$ is set to 6 degrees for the MX-Z19 but may be set according to the kind of a liquid crystal.

[Embodiment 5]

The present embodiment will be described on a liquid crystal display device manufacturing method different from that of Embodiment 1 with reference to FIGS. 7 and 8.

In Embodiment 1 to Embodiment 4, the photosensitive acrylic resin has been used for the orientation regulating member. However, the present embodiment is exemplified by a method of manufacturing a liquid crystal display device using a photosensitive epoxy resin as the orientation regulating member.

Here, the remaining manufacture steps have already been described in Embodiment 1. Therefore, the detailed manufacture steps will be referred to those of Embodiment 1, the description of which will be omitted.

There is prepared an active matrix substrate 301. On this active matrix substrate 301, there are formed: a display pixel portion 303; a peripheral drive circuit 304 having a gate wiring line side drive circuit 304a and a source wiring line side drive circuit 304b; and an external leading wiring line portion 305. Over the display pixel portion 303, there is formed a pixel electrode 307.

On the other hand, an opposed substrate 302 is provided with an opposed electrode 306 and so on.

Next, an orientation regulating member 308 is formed over the active matrix substrate 301. As the material for the orientation regulating member 308, there is used the NOA60 (i.e., Noland Product) which is a material composed mainly of an epoxy resin. This material is set to have a thickness of 4.2 microns. The NOA60 is formed by a screen printing method and is temporarily backed to form an orientation regulating member 708, as shown in FIG. 7A. Next, a photomask 701 shown in FIG. 7B is used for an exposure with a Xe—Hg lamp (50 nm). In short, the epoxy resin is exposed through the aperture of the photomask. After this, the substrate is developed with a developer and is dried. The dried substrate is subjected to a baking treatment. As a result, the orientation regulating member 308 is formed to have a wall shape along the peripheral portion (or the outer periphery) of the substrate, as shown in a top plan view in FIG. 7C. The orientation regulating member 308 is composed of a trunk portion 308a and a branch portion 308b having concaves, as shown in a sectional view along dotted line B–B'. The liquid crystal molecules are arrayed in the concaves. The trunk portion 308a of the orientation regulating member has a height of about 4 microns.

There are executed the steps used in Embodiment 1: the step of forming a spacer 309; the step of applying an orientation film 310 and an orientation film 311; the rubbing step; the step of forming a seal member 312 along the outer periphery of the orientation regulating member 308; the step of adhering the active matrix substrate 301 and the opposed substrate 302; the dividing step; and the step of injecting a liquid crystal 314. As the liquid crystal, that described in Embodiment 1 may be used, A rubbing direction 316 is aligned with the longitudinal direction of the space 309 and the longitudinal direction of the branch portion 308b of the orientation regulating member. As shown in FIGS. 8B and 8C, the branch portion 308b of the orientation regulating member promotes the orientation of the longer axis direction of the liquid crystal molecules in the rubbing direction 316. Moreover, the spacer 309 also promotes the orientation of the longer axis direction of the liquid crystal molecules in the rubbing direction 316. The step of sealing with an ultraviolet setting type resin 315, the steps of cleaning and the re-orientation, and the step of connecting the FPC (although not shown) with the external leading wiring line portion are passed to provide the liquid crystal display device shown in FIGS. 8A to 8C. FIG. 8B is a top plan view of the liquid crystal display device of the present embodiment, and FIG. 8A is a sectional view of the liquid crystal display device of the present embodiment, as taken along a dotted line A3–A3'.

In the liquid crystal display device manufacturing method of the present invention, the column-shaped spacer and the orientation regulating member are formed at the different steps. However, the orientation regulating member may be formed simultaneously with the column-shaped spacer. However, a step is formed between the portion to form the column-shaped spacer and the portion to form the orientation regulating member, and a new spacer may be formed over the orientation regulating member.

In the present embodiment, the spacer 309 is formed after the orientation regulating member 308 was formed. However, the orientation regulating member 308 may be formed after the spacer 309 was formed.

In the present embodiment, the liquid crystal display device is manufactured by combining the active matrix substrate 301 having the orientation film and the opposed substrate 302 having the orientation film. As in the method used in Embodiment 3, however, there may be combined either the active matrix substrate provided with the pixel electrode having the concaves or the opposed substrate provided with the opposed electrode having the concaves. Alternatively, there may be combined the active matrix substrate provided with the pixel electrode having the concaves and the opposed substrate provided with the opposed electrode having the concaves.

The orientation regulating member can also be formed over the opposed substrate by using the manufacture method of the present embodiment. In this case, it is desired to form the seal member on the opposed substrate.

The orientation regulating member of the present embodiment can also be applied to the liquid crystal display device of the liquid crystal having the dislocation angle.

The branch portion of the seal member itself may be formed by using the screen printing method but is crushed at the adhering step. It is, therefore, more difficult than the present embodiment to control the width of the branch portion uniformly.

[Embodiment 6]

In the liquid crystal display device formed by executing the invention thus far described, the invention can be practiced in all the electronic devices that has the liquid crystal display device incorporated into the display unit.

As this electronic device, there can be enumerated a video camera, a digital camera, a projector (of rear or front type), a head-mounted display (or a goggles type display), a car navigation, a car stereo, a personal computer, a mobile information terminal (e.g., a mobile computer, a mobile telephone, an electronic book or an electronic note), a display, a car-mounted back confirming liquid crystal monitor, a TV telephone or an electronic game player, as exemplified in FIGS. 9, 10, 11 and 12.

Figure 9A:
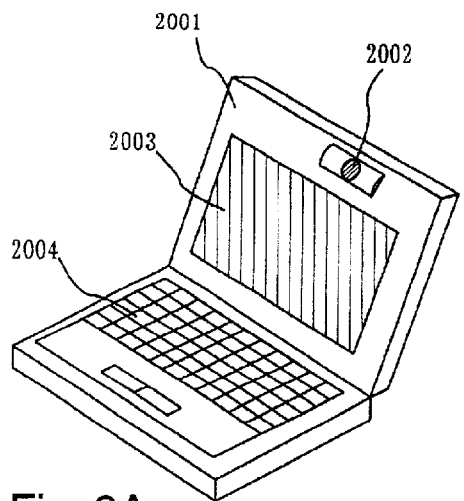
FIGS. 9A to 9F are diagrams showing examples of electronic devices.

FIG. 9A shows the personal computer which includes a body 2001, an image input unit 2002, a display unit 2003 and a keyboard 2004. The present invention can be applied to the display unit 2003.

Figure 9B:
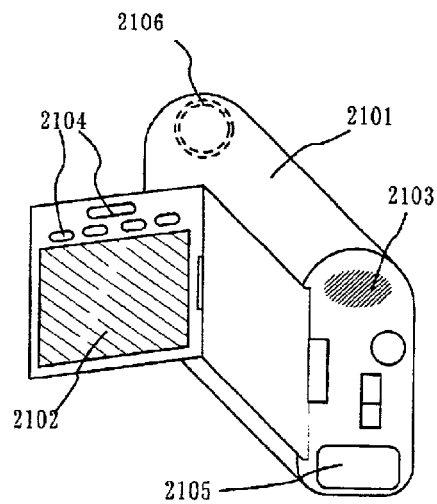

FIG. 9B shows the video camera which includes a body 2101, a display unit 2102, a voice input unit 2103, a control switch 2104, a battery 2105 and a receiver unit 2106. The present invention can be applied to the display unit 2102.

Figure 9C:
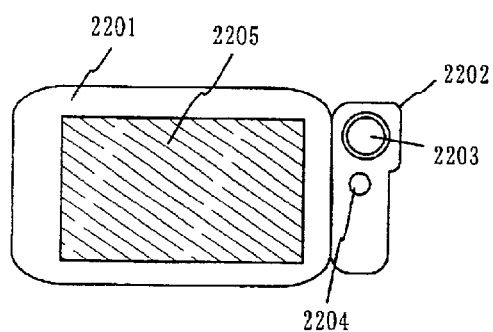

FIG. 9C shows the mobile computer (or the mobile computer) which includes a body 2201, a camera unit 2202, a receiver unit 2203, a control switch 2204 and a display unit 2205. The present invention can be applied to the display unit 2205.

Figure 9D:
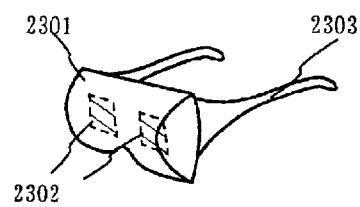

FIG. 9D shows the goggles type display which includes a body 2301, a display unit 2302 and an arm unit 2303. The present invention can be applied to the display unit 2302.

Figure 9E:
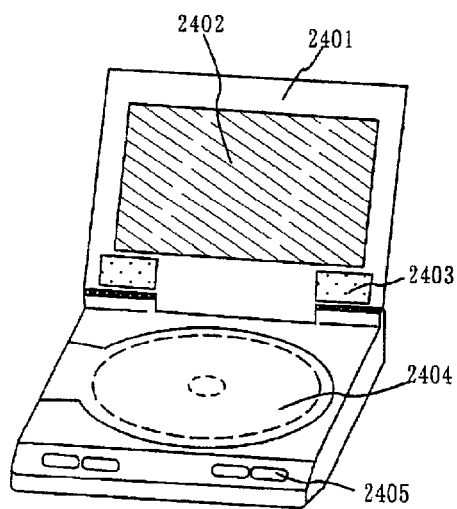

FIG. 9E shows the player using a recording medium recorded with programs (as will be shortly called the "recording medium"), which includes a body 2401, a display unit 2402, a speaker unit 2403, a recording medium 2404 and a control switch 2405. Here, this player allows the player to enjoy musics or movies and to play games or internets by suing DVD (Digital Versatile Disk) or CD as the recording medium. This player can be called the "electronic player". The present invention can be applied to the display unit 2402.

Figure 9F:
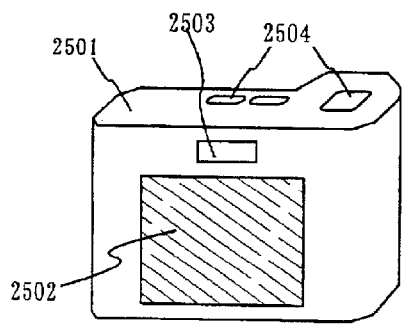

FIG. 9F shows the digital camera which includes a body 2501, a display unit 2502, an eyepiece unit 2503, a control switch 204 and a receiver (although not shown) unit. The present invention can be applied to the display unit 2502.

Figure 10A:
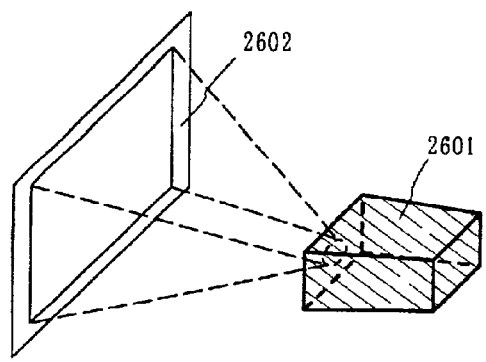
FIGS. 10A to 10D are diagrams showing examples of electronic devices.

FIG. 10A shows a front type projector which includes a projection unit 2601 and a screen 2602. The present invention can be applied to a liquid crystal display device 2808 or another signal control circuit forming part of the projection unit 2601.

Figure 10B:
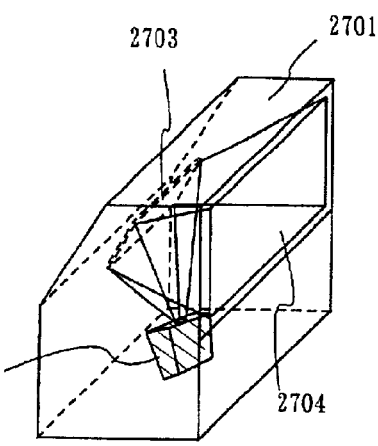

FIG. 10B is a rear type projector which includes a body 2701, a projection unit 2702, a mirror 2703 and a screen 2704. The present invention can be applied to a liquid crystal display device 2808 or another signal control circuit forming part of the projection unit 2702.

Figure 10C:
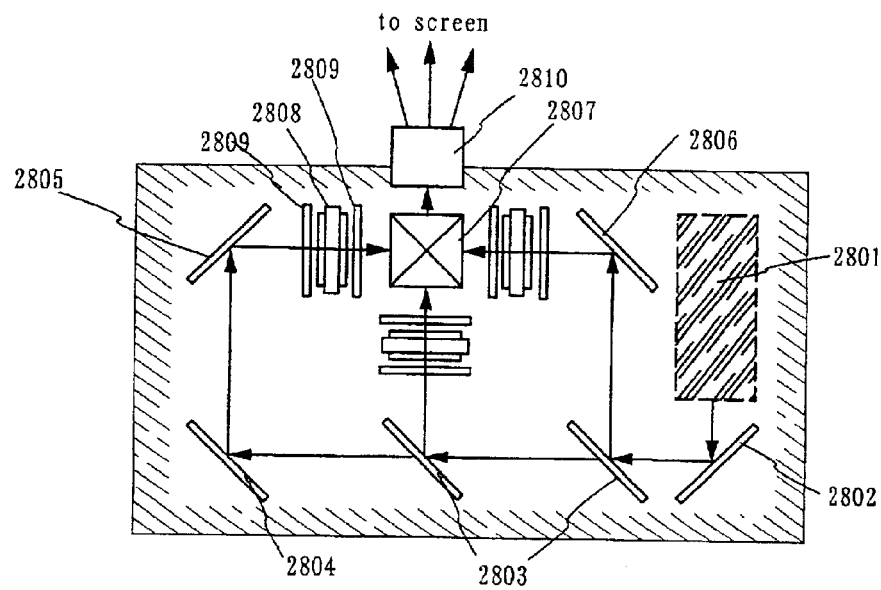

Here, FIG. 10C shows one example of the construction of the projection unit 2601 and 2702 in FIGS. 10A and 10B. The projection unit 2601 or the projection unit 2702 includes a light source optical system 2801, a mirror 2802, mirrors 2804 to 2806, a dichroic mirror 2803, a prism 2807, a liquid crystal display device 2808, a phase difference plate 2809 and a projection optical system 2810. This projection optical system 2810 is constructed of an optical system including a projection lens. The present embodiment is exemplified by a three-mirror type, and should not be especially limited thereto but may be of a single mirror type. Moreover, the practitioner may suitably dispose an optical system such as an optical lens, a film having a polarizing function, a film for adjusting the phase difference or an IR film in the optical path, as indicated by arrows in FIG. 10C.

Figure 10D:
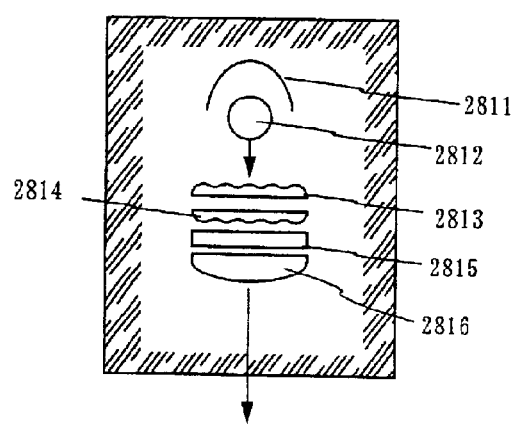

FIG. 10D shows one example of the construction of the light source optical system 2801 in FIG. 10C.

In the present embodiment, the light source optical system 2801 is constructed to include a reflector 2811, a light source 2812, a lens array 2813, a lens array 2814, a polarizing transformation element 2815 and a condenser lens 2816. Here, the light source optical system shown in FIG. 10D is just an example, but the present invention should not be especially limited thereto. For example, the practitioner may suitably dispose an optical system such as an optical lens, a film having a polarizing function, a film for adjusting the phase difference or an IR film in the light source optical system.

In the projector shown in FIG. 10, however, there is shown the case, in which the transmission type liquid crystal display device is used, but not an example of the application of a reflection type liquid crystal display device.

Figure 11A:
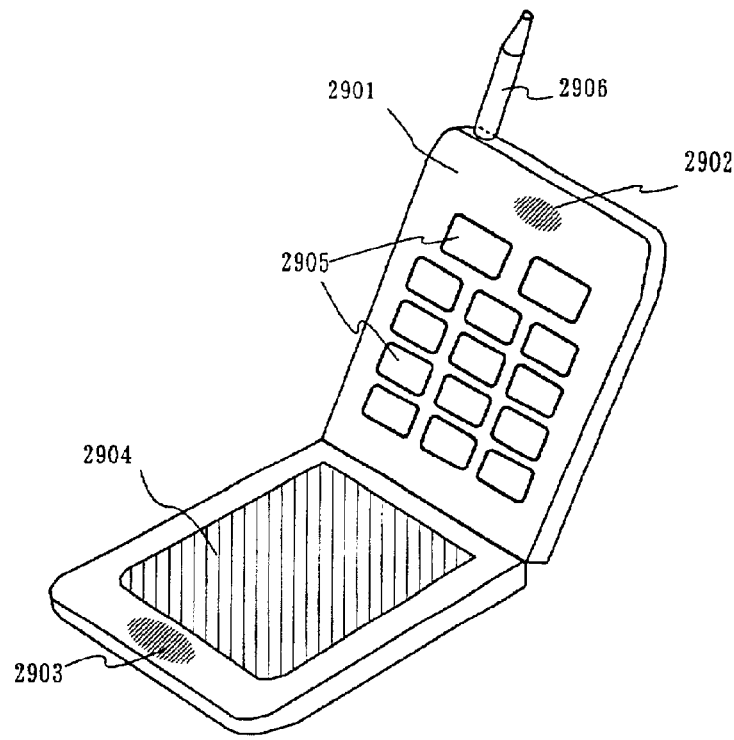
FIGS. 11A to 11C are diagrams showing examples of electronic devices.

FIG. 11A shows the mobile telephone which includes a body 2901, a voice output unit 2902, a voice input unit 2903, a display unit 2094, a control switch 2905 and an antenna 2906. The present invention can be applied to the display unit 2904.

Figure 11B:
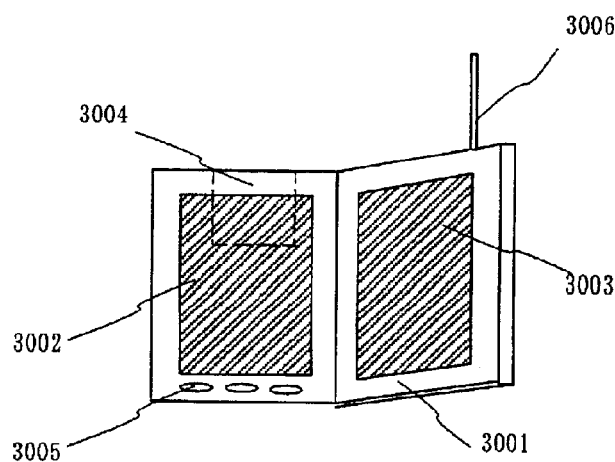

FIG. 11B shows the mobile book (or the electronic book) which includes a body 3001, display units 3002 and 3003, a storage medium 3004, a control switch 3005 and an antenna 3006. The present invention can be applied to the display unit 3002.

Figure 11C:
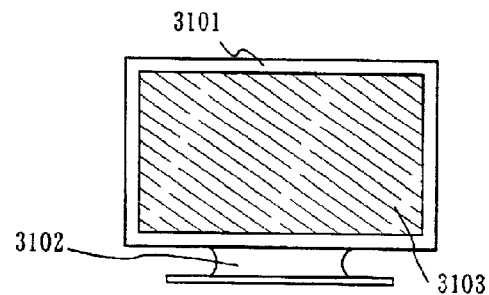

FIG. 11C shows the display which includes a body 3101, a support 3102 and a display unit 3103. The present invention can be applied to the display unit 3103. The display of the present invention is advantageous especially where it is enlarged to have a diagonal of 10 inches or more (especially 30 inches or more).

Figure 12A:
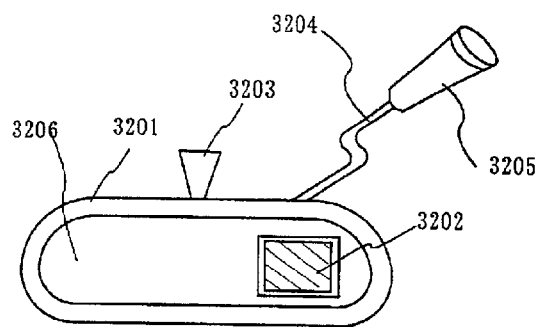
FIGS. 12A to 12D are diagrams showing examples of electronic devices.

FIG. 12A shows the car-mounted back confirmation monitor which includes a body 3201, a display unit 3202, a connection unit 3203 with the car, a relay cable 3204, a camera 3205 and a mirror 3206. The present invention can be applied to the display unit 3202. In the present embodiment, the display unit 3202 is packaged in the mirror 3206. However, the mirror and the display unit may be divided.

Figure 12B:
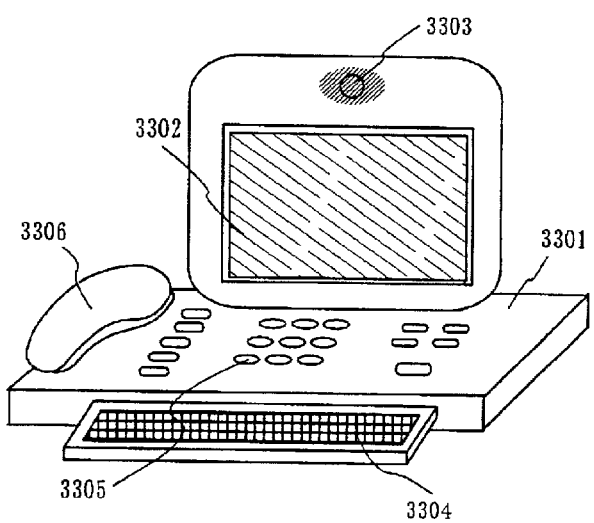

FIG. 12B shows the TV telephone which includes a body 3301, a display unit 3302, a receiver unit 3303, a keyboard 3304, a control switch 3305 and a receiver 3306. The present invention can be applied to the display unit 3303.

Figures 12C, 12D:
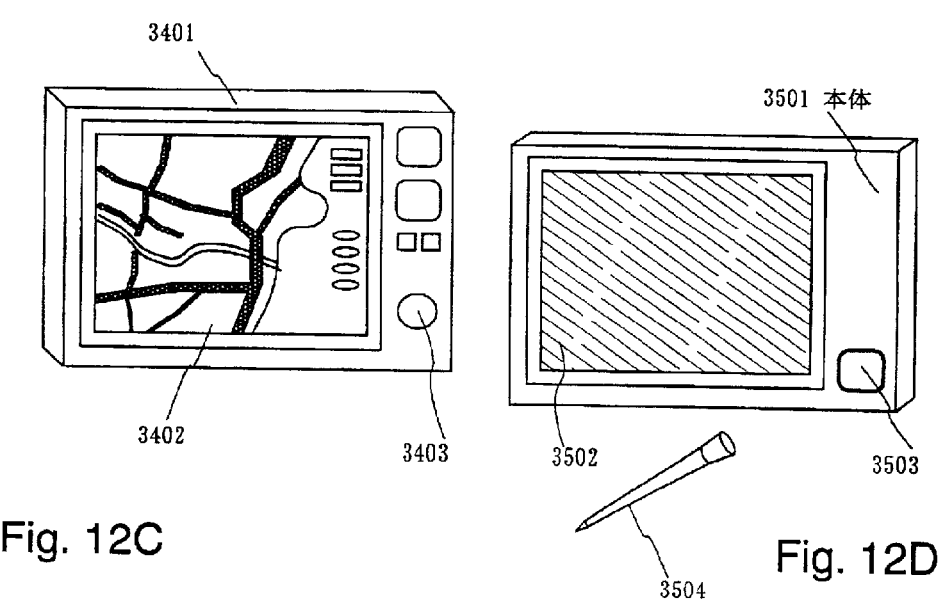
Figure 13:
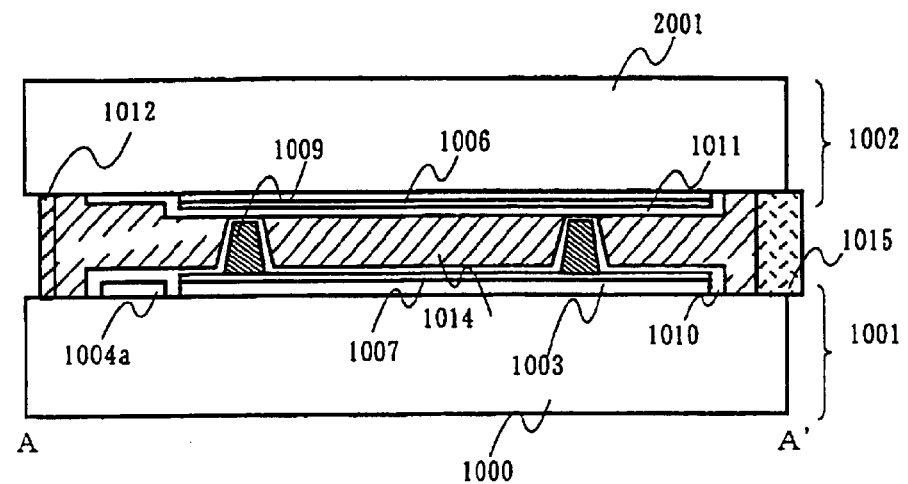
FIG. 13 presents diagrams showing an active matrix type liquid crystal display device of the prior art.
Figure 13:
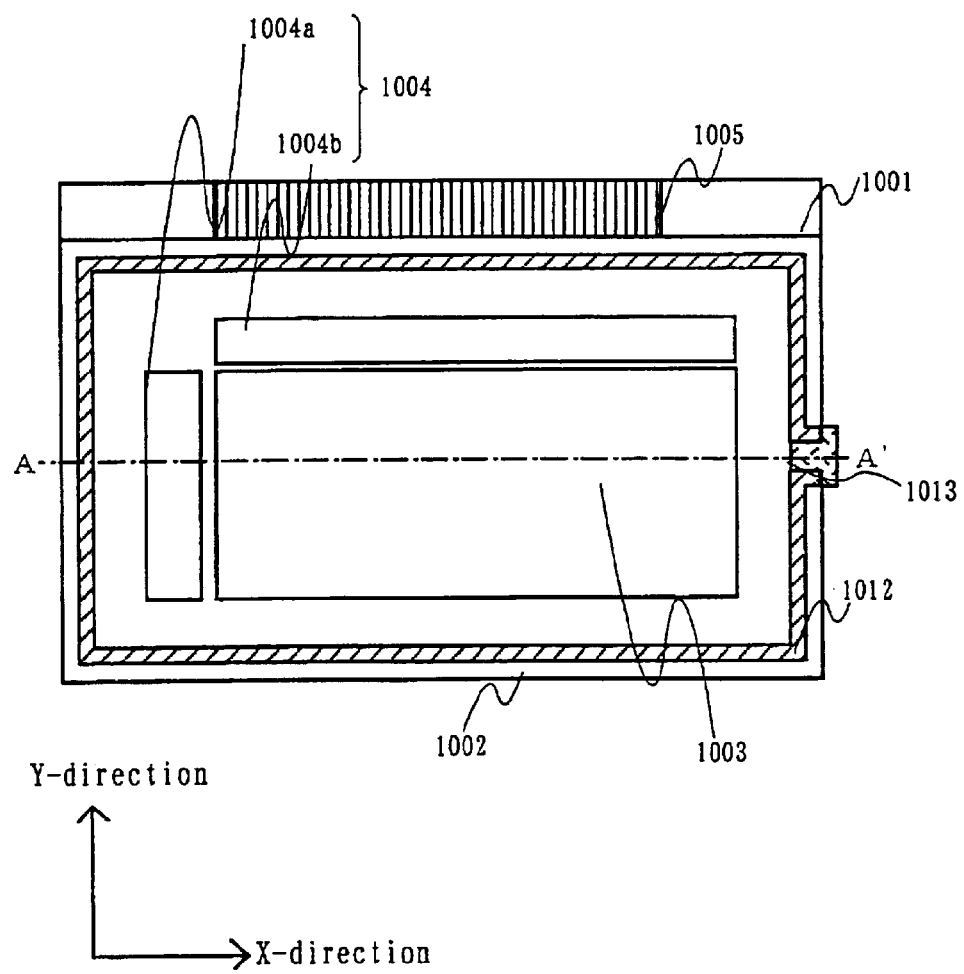

FIG. 12C shows the car navigation which includes a body 3401, a display unit 3402 and a control switch 3403. The present invention can be applied to the display unit 3402. A picture of roads is displayed in the display unit 3402.

FIG. 12D shows the electronic note which includes a body 3501, a display unit 3502, a control switch 3503 and an electronic pen 3504. The present invention can be applied to the display unit 3503.

The present invention can be applied not only to the liquid crystal display device using the TFT as the switching element but also to a liquid crystal display device using the MIM (Metal Insulator Metal) as the switch element. This MIM is also called the TFD (Thin Film Diode). Moreover, the present invention can be applied to the liquid crystal display device of a simple matrix (or a passive matrix) in which scanning electrodes and signal electrodes perpendicular to the former are arrayed on the opposed faces in the opposed substrate.

Moreover, the present invention can also be applied to the liquid crystal injection under the normal pressure in the device which has a discharge port in the side opposed to the injection port of the liquid crystal display device.

The process for manufacturing the liquid crystal display device of the present invention can also be applied not only to the injection of the liquid crystal but also to the technical field in which a functional material of a low viscosity is injected into a clearance as narrow as several microns.

According to the liquid crystal display device of the present invention, the substrate spacing can be held uniform not only to increase the mechanical strength and but also to decrease the use of the liquid crystal.

In the liquid crystal display device of the present invention, moreover, the liquid crystal molecules can be homogeneously arrayed to establish a satisfactory black level when no voltage is applied, so that the contrast is improved.

Moreover, the migration of the seal member into the liquid crystal due to the deterioration of the seal member can be prevented so that the present invention can provide a technique for manufacturing a liquid crystal display device of a high production yield.

What is claimed is:

1. A liquid crystal display device comprising:
 a pair of substrates;
 a seal material interposed between the pair of substrates;
 an orientation regulating member comprising a trunk portion formed along an inner side of the seal material and a branch portion protruded from the trunk portion; and
 a liquid crystal filling an inner side of the orientation regulating member,
 wherein at least one of the pair of substrates is transparent.

2. A liquid crystal display device according to claim 1, wherein an angle θ made between the trunk portion and the branch portion of the orientation regulating member is within a range of 0.1 to 179.9 degrees, preferably 40 to 140 degrees.

3. A liquid crystal display device according to claim 1, wherein a width of the branch portion is within a range of 2 to 20 microns.

4. A liquid crystal display device according to claim 1, wherein a distance between a side which is the closest side to the trunk portion among the four sides of the branch portion and the trunk portion is within a range of 5 to 15 mm.

5. A liquid crystal display device according to claim 1, the liquid crystal display device further comprising at least one spacer for keeping constant the spacing between the pair of substrates, wherein a longitudinal direction of the branch portion is aligned with that of the spacer.

6. A liquid crystal display device according to claim 5, wherein a longitudinal direction of the spacer is aligned with a direction of an orienting treatment.

7. A liquid crystal display device according to claim 5, wherein the liquid crystal display device further comprises an electrode having a concave portion, wherein a longitudinal direction of the concave portion is aligned with that of the branch portion.

8. A liquid crystal display device according to claim 7, wherein the concave portion is aligned with a second wiring line.

9. A liquid crystal display device according to claim 1, wherein a longitudinal direction of the branch portion is aligned with a direction of an orienting treatment.

10. A liquid crystal display device according to claim 9, wherein a longitudinal direction of at least one spacer is aligned with a direction of an orienting treatment.

11. A liquid crystal display device according to claim 9, wherein the liquid crystal display device further comprises an electrode having a concave portion, wherein a longitudinal direction of the concave portion is aligned with that of the branch portion.

12. A liquid crystal display device according to claim 1, wherein the liquid crystal display device further comprises an electrode having a concave portion, wherein a longitudinal direction of the concave portion is aligned with that of the branch portion.

13. A liquid crystal display device according to claim 12, wherein the concave portion is aligned with a second wiring line.

14. A liquid crystal display device according to claim 1, wherein the liquid crystal is an anti-ferroelectric liquid crystal.

15. A liquid crystal display device according to claim 1, wherein the orientation regulating member comprises acrylic resin.

16. A liquid crystal display device according to claim 1, wherein the orientation regulating member comprises epoxy resin.

17. A liquid crystal display device according to claim 1, wherein the liquid crystal display device is a display device selected from the group consisting of: a personal computer, a video camera, a portable information terminal, a digital camera, a display, a car-mounted back confirming liquid crystal monitor, a TV telephone, a car navigation and electric amusement apparatus.

18. A liquid crystal display device comprising:
a pair of substrates;
a seal material interposed between the pair of substrates;
an orientation regulating member comprising a trunk portion formed along an inner side of the seal material and a branch portion protruded from the trunk portion;
a liquid crystal filling an inner side of the orientation regulating member,
wherein at least one of the pair of substrates is transparent, and
wherein the liquid crystal is not in contact with the seal material.

19. A liquid crystal display device according to the claim 18, wherein the liquid crystal is an anti-ferroelectric liquid crystal.

20. A liquid crystal display device according to claim 18, wherein the orientation regulating member comprises acrylic resin.

21. A liquid crystal display device according to claim 18, wherein the orientation regulating member comprises epoxy resin.

22. A liquid crystal display device according to claim 2, wherein the liquid crystal display device is a display device selected from the group consisting of: a personal computer, a video camera, a portable information terminal, a digital camera, a display, a car-mounted back confirming liquid crystal monitor, a TV telephone, a car navigation and electric amusement apparatus.

23. A liquid crystal display device comprising:
a pair of substrates;
a seal material interposed between the pair of substrates;
an object comprising a first portion formed along an inner side of the seal material and a second portion protruded from the first portion; and
a liquid crystal filling an inner side of the object.

24. A liquid crystal display device according to claim 23, wherein the object comprises acrylic resin.

25. A liquid crystal display device comprising:
a pair of substrates;
a seal material interposed between the pair of substrates;
an object comprising a first portion formed along an inner side of the seal material and a second portion protruded from the first portion; and
a liquid crystal filling an inner side of the object,
wherein at least one of the pair of substrates is transparent.

26. A liquid crystal display device according to claim 25, wherein the object comprises acrylic resin.

27. A liquid crystal display device comprising:
a pair of substrates;
a seal material interposed between the pair of substrates;
an object comprising a first portion formed along an inner side of the seal material and a second portion protruded from the first portion;
a liquid crystal filling an inner side of the object,
wherein the liquid crystal is not in contact with the seal material.

28. A liquid crystal display device according to claim 27, wherein the object comprises acrylic resin.

29. A liquid crystal display device comprising:
a pair of substrates;
a seal material interposed between the pair of substrates;
an object comprising a first portion formed along an inner side of the seal material and a second portion protruded from the first portion;
a liquid crystal filling an inner side of the object,
wherein at least one of the pair of substrates is transparent, and
wherein the liquid crystal is not in contact with the seal material.

30. A liquid crystal display device according to claim 29, wherein the object comprises acrylic resin.

* * * * *